(12) United States Patent
Zimmet

(10) Patent No.: US 7,815,838 B2
(45) Date of Patent: Oct. 19, 2010

(54) METHOD OF OPERATING AN INJECTION MOLDING MACHINE WITH CONTINUOUSLY OPERATING PLASTICIZING UNIT

(75) Inventor: Rainer Zimmet, Neckarwestheim (DE)

(73) Assignee: KraussMaffei Technologies GmbH, München (DE)

( * ) Notice: Subject to any disclaimer, the term of this patent is extended or adjusted under 35 U.S.C. 154(b) by 841 days.

(21) Appl. No.: 11/537,125

(22) Filed: Sep. 29, 2006

(65) Prior Publication Data
US 2008/0079196 A1    Apr. 3, 2008

Related U.S. Application Data

(60) Division of application No. 10/272,122, filed on Oct. 15, 2002, now Pat. No. 7,160,102, which is a continuation of application No. PCT/EP01/04250, filed on Apr. 12, 2001.

(30) Foreign Application Priority Data

Apr. 14, 2000   (DE) .................................. 100 18 542

(51) Int. Cl.
    *B29B 7/00*    (2006.01)
(52) U.S. Cl. ................. 264/328.1; 264/328.8; 425/557; 425/558; 425/559; 425/560; 425/561
(58) Field of Classification Search .......... 425/557–561
    See application file for complete search history.

(56) References Cited

U.S. PATENT DOCUMENTS

| | | |
|---|---|---|
| 3,191,233 A | 6/1965 | Linderoth |
| 5,000,900 A | 3/1991 | Baumgartner |
| 5,011,399 A | 4/1991 | Farrell |
| 5,110,279 A | 5/1992 | Amemiya et al. |
| 5,267,788 A | 12/1993 | Rockstedt |
| 5,403,178 A | 4/1995 | Steger |
| 5,605,707 A | 2/1997 | Ibar |
| 5,770,245 A | 6/1998 | Takizawa et al. |
| 5,925,295 A * | 7/1999 | Nakamura et al. ......... 264/40.1 |
| 6,017,210 A | 1/2000 | Takayama et al. |
| 6,224,812 B1 * | 5/2001 | Allan et al. .............. 264/328.1 |
| 6,241,932 B1 | 6/2001 | Choi et al. |
| 6,403,010 B1 | 6/2002 | Ganz et al. |

FOREIGN PATENT DOCUMENTS

| | | |
|---|---|---|
| AT | 403 776 | 5/1998 |
| DE | 20 49 991 A | 4/1971 |
| DE | 22 01 404 A | 7/1973 |
| DE | 31 21 428 | 2/1982 |

(Continued)

*Primary Examiner*—Eric Hug
*Assistant Examiner*—Jacob Thomas Minskey
(74) *Attorney, Agent, or Firm*—Henry M. Feiereisen; Ursula B. Day

(57) ABSTRACT

In a method of operating an injection molding machine of a type having an injection plunger for pushing melt from an injection space anteriorly of an injection plunger into an injection mold, a plasticizing screw of an extruder is continuously operated to continuously feed melt through a melt channel into the injection space. A passage through the melt channel is closed to allow backup of melt backwards into the extruder, and the injection plunger is moved forward to inject a shot amount from the injection space into the injection mold.

4 Claims, 2 Drawing Sheets

FOREIGN PATENT DOCUMENTS

| | | |
|---|---|---|
| DE | 40 18 484 A | 12/1991 |
| DE | 43 04 489 | 9/1993 |
| DE | 43 31 207 A | 3/1995 |
| DE | 195 05 984 | 8/1996 |
| DE | 197 20 630 | 11/1998 |
| DE | 198 19 087 A1 | 11/1999 |
| FR | 71 31 421 | 4/1973 |
| GB | 11 66 472 | 10/1969 |
| GB | 11 72 707 | 12/1969 |
| JP | 4022613 A | 1/1992 |
| JP | 4286617 A | 10/1992 |
| JP | 10286849 A | 10/1998 |
| WO | WO 86/06321 | 11/1986 |
| WO | WO 97/11829 A | 4/1997 |

* cited by examiner

METHOD OF OPERATING AN INJECTION MOLDING MACHINE WITH CONTINUOUSLY OPERATING PLASTICIZING UNIT

CROSS-REFERENCES TO RELATED APPLICATIONS

This application is a division of prior filed copending U.S. application Ser. No. 10/272,122, filed Oct. 15, 2002, which in turn is a continuation of prior filed copending PCT International application no. PCT/EP01/04250, filed Apr. 12, 2001, which designated the United States and on which priority is claimed under 35 U.S.C. §120, the disclosure of which is hereby incorporated by reference, and which claims the priority of German Patent Application, Serial No. 100 18 542.8, filed Apr. 14, 2000, pursuant to 35 U.S.C. 119(a)-(d), the contents of which are incorporated herein by reference.

BACKGROUND OF THE INVENTION

The present invention relates, in general, to an injection unit for injection molding machines with continuously operating plasticizing unit.

Injection molding machines are known in which a reciprocating screw equipped with a back flow valve implements the plastification of the plastic granulate and generates the injection pressure. Other approaches involve an operational division between a screw plasticizing unit, on the one hand, and a plunger-type injection unit, on the other hand. Constructions of this type have the advantage that a screw plasticizing unit can operate at optimum plasticizing capacities. Moreover, the use of several plunger-type injection units, fed from a screw plasticizing unit, permits the screw plasticizing unit to be continuously operated because melt can be fed alternatingly to the various, normally two, plunger-type injection units. A continuous operation of the plasticizing unit is advantageous because not only is the melt more homogenous, but the plasticizing capacity can be increased since shutdown periods are eliminated or a smaller screw can be utilized while maintaining a same capability. Furthermore, wear is significantly reduced, in particular when large screws are involved, because there is no need for a constant re-starting (absence of adhesive wear during start-up). Also the motor and the transmission are subject to less stress in view of the even load.

A screw plasticizing unit in combination with plunger-type injection units can also be used as compounder for mixing varied components. As the plasticizing screw is not moved back and forth, solid and liquid additives can always be fed at the same location relative to the screw. The same is true, when producing foamed products, because foaming agent can also be added always at the same spot. The continuous operation prevents an undesired pressure drop of the foaming agent, as has been-experienced with injection molding machines with reciprocating screws during shutdown period.

An injection molding machine with a separate plasticizing unit, on the one hand, and several plunger-type injection devices, on the other hand, suffers however the drawback that the plurality of existing plunger-type injection devices requires significant space for installation. Moreover, long melt channels that need to be heated, and respective pressure losses have to be accepted. Further, the alternating feeding of the plunger-type injection units require reverse valves. Typically, also the purging quality is poor because the cylinder spaces of the plunger-type injection units cannot be filled and emptied according to the principal of a continuous melt stream flowing in only one direction (first-in, first-out).

German Pat. No. DE 195 05 984 A1 discloses an injection molding machine with separate and continuously operating plasticizing unit and two plunger-type injection devices, but with unidirectional melt flow (first-in, first-out). This publication illustrates an injection molding machine in which a screw plasticizing unit, comprised of two plasticizing screws running in a same direction, is connected downstream to two plunger-type injection devices which, controlled by reverse valves, can be fed alternatingly with melt. A unidirectional melt flow is realized in this injection molding machine by supplying each plunger-type injection device through conduction of melt via telescopically movable melt channels into the respective plunger bottom of the plunger-type injection devices. This significantly increases, however, the length of the melt channel.

International patent publication WO08/06321 discloses an injection molding machine for manufacturing injection-molded or extruded formed parts of mixed materials. Examples of mixed materials include hereby plastics with additional components such as fibers, particles, binders or other additives. The plastic granulate is melted in a twin or multiple screw compounder. The additional components are also added to the compounder and mixed with the plastic melt as homogeneously as possible. A melt channel extends from the forward end of the compounder and connects into the rear region of an injection space in which an injection plunger is guided for reciprocating movement. Melt flows through a back flow valve, arranged at the forward end of the injection plunger, and fills the injection space in front of the injection plunger to thereby push the injection plunger backwards. When enough melt fills the injection space, the compounder is stopped and the supply of melt is interrupted. Melt, stored in the injection space, is injected into the injection mold as the injection plunger is moved forward through application of a pressure medium. After filling the mold cavity, an afterpressure plunger, disposed downstream of the injection space and engaging the melt exit channel, which extends to the mold cavity, blocks the melt exit channel, connected to the injection space, and, optionally, to generate an afterpressure. This conventional injection molding machine includes an unidirectional melt flow (first-in, first-out) and avoids long melt paths, when several plunger-type injection devices are involved (like, for example, in German Pat. No. DE 195 05 984 A1). It is, however, disadvantageous that the compounder has to be stopped during the injection phase and afterpressure phase. This adversely affects the melt quality because only a continuous operation of the compounder (or extruder) provides for a homogeneous melt throughout. Moreover, the provision of back flow valves is disadvantageous when processing melts filled with long fibers or natural fibers because a flow through narrow and wound openings in the back flow valve entails a risk of damage of the fibers.

It would be desirable and advantageous to provide an improved an injection unit for injection molding machines to obviate prior art shortcomings and to allow a permanent continuous operation of the plasticizing unit regardless of the cycle time in combination with an intermittent operation of the injection molding process.

SUMMARY OF THE INVENTION

According to one aspect of the present invention, an injection unit for an injection molding machine, includes a plasticizing unit in the form of a continuously operated extruder having at least one plasticizing screw, a plunger-type injection device including an injection nozzle for interaction with an injection mold, and an injection plunger demarcating anteriorly thereof an injection space which is connected to a forward end of the extruder by a melt channel; and a shutoff valve disposed in the melt channel, wherein the extruder is so configured that a backup length is able to expand backwards into the extruder, when the shutoff valve is closed.

The present invention resolves prior art problems by combining an injection plunger with an extruder having one or more plasticizing screws, whereby the extruder is so configured that melt can backup further to the rear of the extruder, when a shutoff valve in the melt channel is closed, so that the extruder itself offers a sufficiently large buffer area for "temporarily storing" melt during the injection phase and afterpressure phase. This is especially true during the production of thinwalled formed parts, when the cooling period is relatively short, so that the extruder can be operated continuously and melt can be buffered in the free space between the screws.

According to another feature of the present invention, the extruder may be a single screw extruder including a barrel, which is defined by a cylinder diameter and accommodates the plasticizing screw, which is defined by an outer diameter, wherein in the area of the backup length the outer diameter of the plastifying screw may be reduced, and/or the cylinder diameter of the barrel may be increased, and/or holes in screw lands may be provided.

According to another feature of the present invention, the extruder may be a twin screw extruder with two plasticizing screws which rotate in a same direction. This configuration provides sufficient free space between the screws for backup of melt so that the backup length can easily expand backwards.

According to another feature of the present invention, the shutoff valve may be an actively controllable shutoff valve.

According to another aspect of the present invention, a method of operating an injection molding machine of a type having an injection plunger for pushing melt from an injection space anteriorly of an injection plunger into an injection mold, with the method including the steps of continuously operating a plasticizing screw of an extruder to continuously feed melt through a melt channel into the injection space, closing a passage through the melt channel to allow backup of melt backwards into the extruder, and moving the injection plunger forward to inject a shot amount from the injection space into the injection mold.

Suitably, the melt channel is closed during the injection phase and/or afterpressure phase.

According to another feature of the present invention, the plasticizing screw is continuously operated by a rotary drive at reduced speed during the injection phase and/or afterpressure phase.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
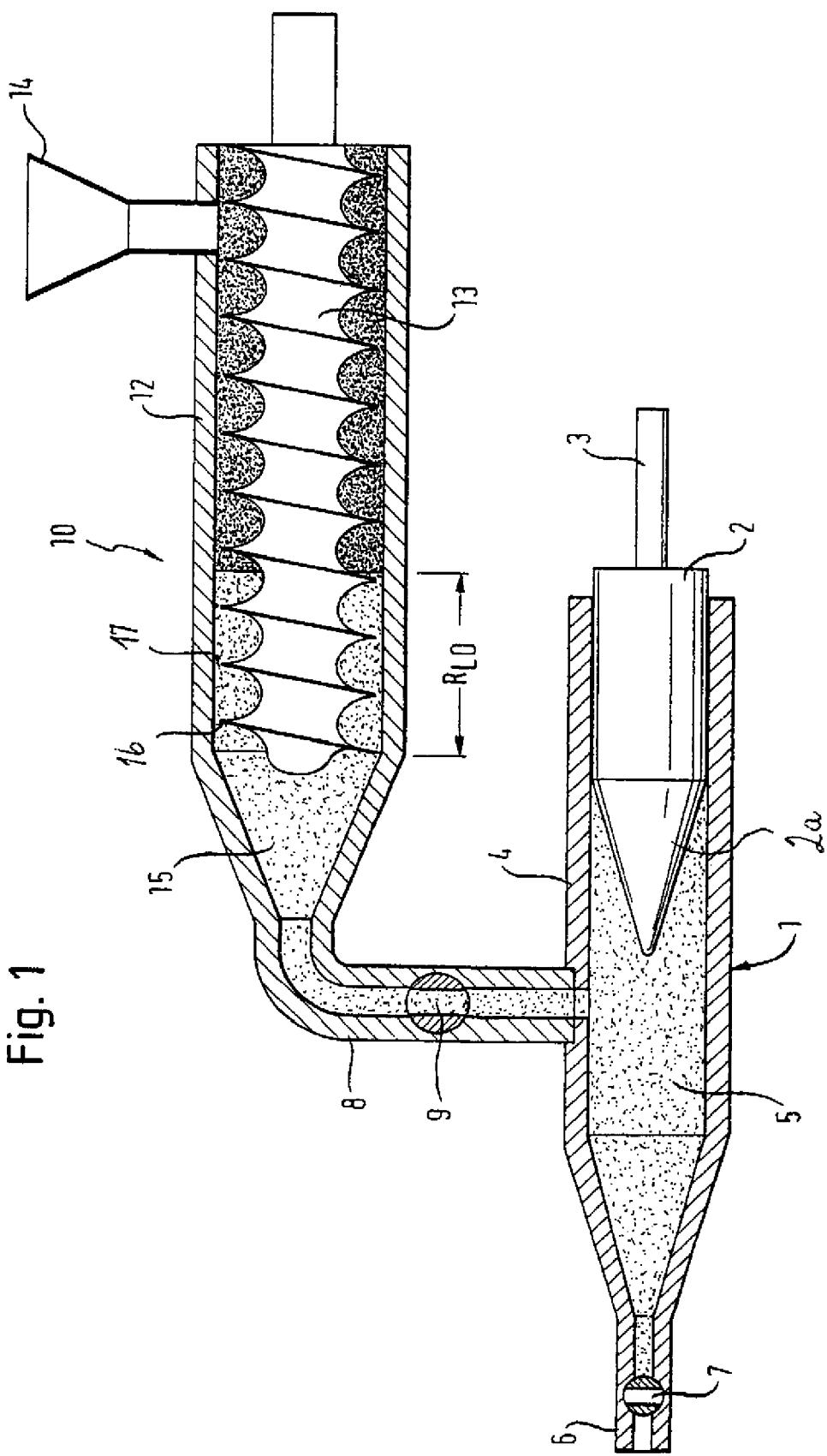
FIG. 1 is a schematic sectional side view of an injection device according to the present invention having a single injection plunger shown in a retracted position shortly before injection of melt into an injection mold.

Throughout all the Figures, same or corresponding elements are generally indicated by same reference numerals.

Turning now to the drawing, and in particular to FIG. 1, there is shown a schematic sectional side view of an injection device according to the present invention. This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "Injection Unit for Injection Molding Machines with Continuously Operating Plasticizing Unit", application Ser. No. 10/272,099. The injection device includes a plunger-type injection unit 1, which includes a housing 4 and an injection plunger 2. The injection plunger 2 has a conical pointed forward portion 2a and reciprocates in the housing 4. Movement of the injection plunger 2 within the housing 4 is realized through actuation of a piston and cylinder unit, of which only piston rod 3 is shown for connection to the injection plunger 2 and which is operated by pressure medium. Formed in the housing 4 anteriorly of the injection plunger 2 is an injection space 5 which receives melt from an extruder, generally designated by reference numeral 10, via a melt channel 8 terminating in a forward area of the injection space 5. The injection space 5 conically tapers in the direction of an injection nozzle 6 through which melt is injected into an injection mold (not shown). Disposed upstream of the injection nozzle 6 is a shutoff valve 7 which regulates a flow of melt from the injection space 5 into the injection mold.

Plastic material is plasticized by the extruder 10 which has an extruder barrel 12 and accommodates one or more plasticizing screws 13 (only one plasticizing screw 13 is shown here by way of example) which can be driven in a conventional manner by a motor and a transmission. The extruder 10 may be a twin screw extruder in which the plasticizing screws 13 rotate in a same direction. A feed hopper 14 is positioned at a rear portion of the extruder barrel 12 to supply plastic granulate to the extruder 10. Arranged in the melt channel 8 is a further actively controllable shutoff valve 9 for regulating a flow of melt between a screw anterior space 15 of the extruder 10 and the injection space 5.

Figure 2:
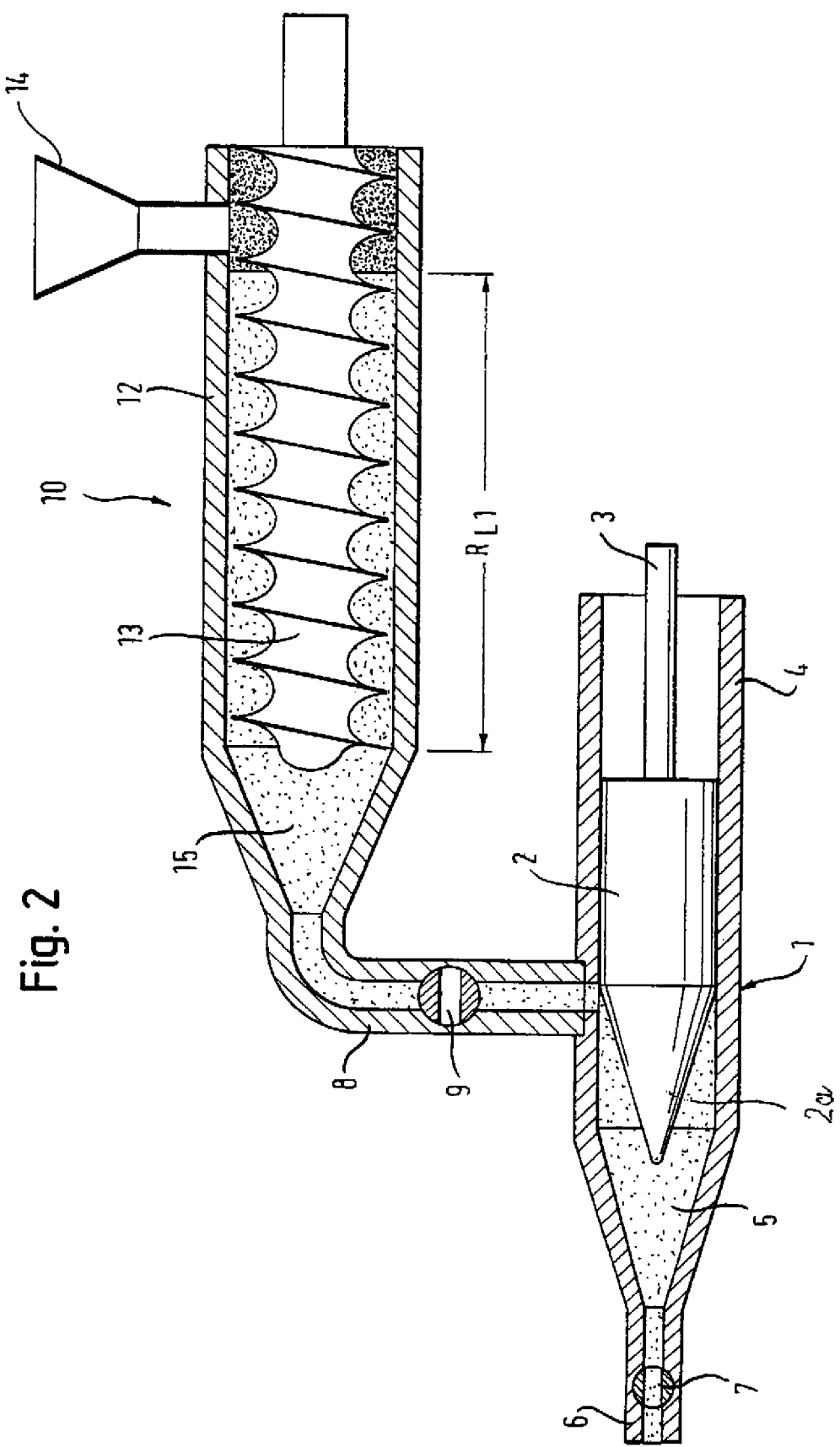
FIG. 2 is a schematic sectional side view of the injection device, illustrating the injection plunger in a forward position after injection of melt into the injection mold.

In accordance with the present invention, the extruder 10 is configured in such a manner that melt can backup in the extruder 10 to a backup length $R_{L1}$, when the shutoff valve 9 is closed, as shown in FIG. 2. Hereby, the plasticizing screw 13 is received within the barrel 12 in a way that the crest 16 of the screw threads is spaced at a distance 17 from the enclosing inside wall of the barrel 12. The spacing 17 between the screw crest 16 and the barrel wall may be realized by reducing the outer diameter of the plasticizing screw 13, or by increasing the cylinder diameter of the barrel 12, or by arranging holes in screw lands in the area of the backup length $R_{L1}$.

During operation of the injection molding machine, the extruder 10 is continuously operated and the injection space 5 is supplied with melt while the shutoff valve 9 is open. FIG. 1 shows a situation prior to injection, in which the injection plunger 2 assumes a retracted position, whereby reference character $R_{L0}$ denotes the initial backup length. When the injection space 5 is filled, the shutoff valve 9 in the melt channel 8 is closed, as illustrated in FIG. 2, while the shutoff valve 7 in front of the injection nozzle 6 is opened. The injection stroke of the injection plunger 2 can now be initiated by means of a hydraulic adjustment device (piston and cylinder unit) to fill the injection mold of the injection molding machine with melt. FIG. 2 shows the situation at the conclusion of the injection stroke. The injection plunger 2 assumes its forwardmost position in the housing 4 and the injection space 5 has its minimum volume.

Next, the shutoff valve 7 in front of the injection nozzle 6 is closed, while the shutoff valve 9 in the melt channel 8 is opened. As a consequence, the injection plunger 2 is moved backwards by incoming melt.

As the plasticizing screw 13 rotates uninterruptedly and material is fed via the feed hopper 14, melt is continuously produced. The extruder 10 may continue to run during the injection stroke and during the dwell time of the injection-molded parts in the mold because during this time, when the shutoff valve 9 is closed, pressure, which builds up in the screw anterior space 15, can propagate to the rear and a fill degree of 1 can be generated little by little in the screw threads. The backup length increases from a value $R_{L0}$ to a value $R_{L1}$. The continuous operation of the extruder 10 is assured, especially when thinwalled form parts or short cycle times are involved, because there is not enough time for an excessive pressure buildup in the screw anterior space 15 and melt can be buffered in this brief period in the area of the backup length $R_{L1}$, as shown in FIG. 2. A twin screw extruder with two plasticizing screws 13, rotating in a same direction, has between the plasticizing screws sufficient free space (no closed screw threads), which enables a sufficient enlargement of the backup length from $R_{L0}$ to $R_{L1}$ and thus provides for a large enough buffer region. Hereby, the pressure, building up in the screw anterior space 15, drops normally linearly from the screw anterior space 15 backwards to the free space between the plasticizing screws.

Of course, this configuration of the afore-described twin screw extruder with plasticizing screws rotating in same direction is described by way of example only, and other configurations which generally follow the concepts outlined here are considered to be covered by this disclosure. For example, the extruder 10 may be configured as a single screw extruder whereby in the area of the backup length the outer screw diameter of the plasticizing screw 12 may be reduced and/or the cylinder diameter of the barrel 12 may be increased, and/or arrangement of holes (not shown) in screw lands may be provided. Another variation involves a construction of the extruder 10 in the form of a twin screw extruder with the two plasticizing screws arranged tangent to one another and thus do not mesh.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of operating an injection molding machine of a type having an injection plunger for pushing melt from an injection space anteriorly of an injection plunger into an injection mold, said method comprising the steps of:
   continuously operating a plasticizing screw of an extruder to continuously feed melt through a melt channel into the injection space, wherein the plasticizing screw defines an axis and is immobile in a direction of the axis;
   closing a passage through the melt channel to allow backup of melt backwards into the extruder; and
   moving the injection plunger forward to inject a shot amount from the injection space into the injection mold.

2. The method of claim 1, and further comprising the step of closing the melt channel during at least one of an injection phase and afterpressure phase.

3. The method of claim 1, and further comprising the step of operating a rotary drive to continuously operate the plasticizing screw at reduced speed during at least one of an injection phase and afterpressure phase.

4. The method of claim 1, wherein the extruder includes two of said plasticizing screw which rotate in a same direction.

* * * * *